June 28, 1955

M. J. BROWN 2,712,100

DUPLEX SWITCHBOARD

Filed Dec. 22, 1951

INVENTOR
Myron J. Brown

ATTORNEY

United States Patent Office 2,712,100
Patented June 28, 1955

2,712,100

DUPLEX SWITCHBOARD

Myron J. Brown, Pittsburgh, Pa., assignor to Westinghouse Electric Corporation, East Pittsburgh, Pa., a corporation of Pennsylvania Application December 22, 1951, Serial No. 262,965

13 Claims. (Cl. 317—122)

My invention relates, generally, to switchboards and, more particularly, to switchboards of the duplex type.

A duplex switch board usually contains a plurality of units disposed side by side, each unit comprising two vertical panels which are disposed back to back and spaced apart sufficiently for workmen to enter the space between the front and the rear panels. Control apparatus, meters and relays are usually mounted on the faces of the switchboard panels to be accessible from outside the switchboard structure for operation and for observation. Auxiliary apparatus, such as resistors, reactors, fuses, etc., which do not require daily observation, are usually mounted at the rear of the panels where they are accessible only by entering the space between the front and the rear panels.

Obviously, the amount of wiring required on the switchboard depends primarily upon the amount of apparatus installed on the switchboard, and a light duty switchboard having a relatively small amount of apparatus thereon does not require the wiring facilities provided on a heavy duty switchboard having a large amount of apparatus thereon. In order to conserve material it is desirable to simplify the structure of a light duty switchboard, particularly the wiring troughs or gutters and the facilities for mounting auxiliary apparatus on the switchboard.

An object of my invention, generally stated, is to provide a light duty duplex switchboard which shall be simple and efficient in operation and which may be economically manufactured and installed.

A more specific object of my invention is to provide a wiring trough which also functions as a mechanical brace between panels and a support for auxiliary apparatus.

Another object of my invention is to provide a flanged wiring trough having openings therein for attaching wire cleats thereto.

A further object of my invention is to provide extension members to increase the capacity of a wiring trough.

Other objects of my invention will be explained fully hereinafter or will be apparent to those skilled in the art.

In accordance with one embodiment of my invention, each unit of a multi-unit duplex switchboard is provided with generally C-shaped horizontally disposed troughs for inter-panel wiring between the front and the rear panels of each unit and generally reversed Z-shaped horizontally disposed troughs for cross-panel wiring between units. One leg of each C-shaped trough has a downwardly extending flange provided with a plurality of holes for attaching mounting brackets for supporting auxiliary apparatus. Reversed Z-shaped brackets may be attached to the C-shaped troughs to increase the capacity of the troughs for wires, and to provide an outlet for the wires to auxiliary apparatus.

For a better understanding of the nature and objects of the invention, reference may be had to the following detailed description, taken in conjunction with the accompanying drawings, in which.

Figure 2:
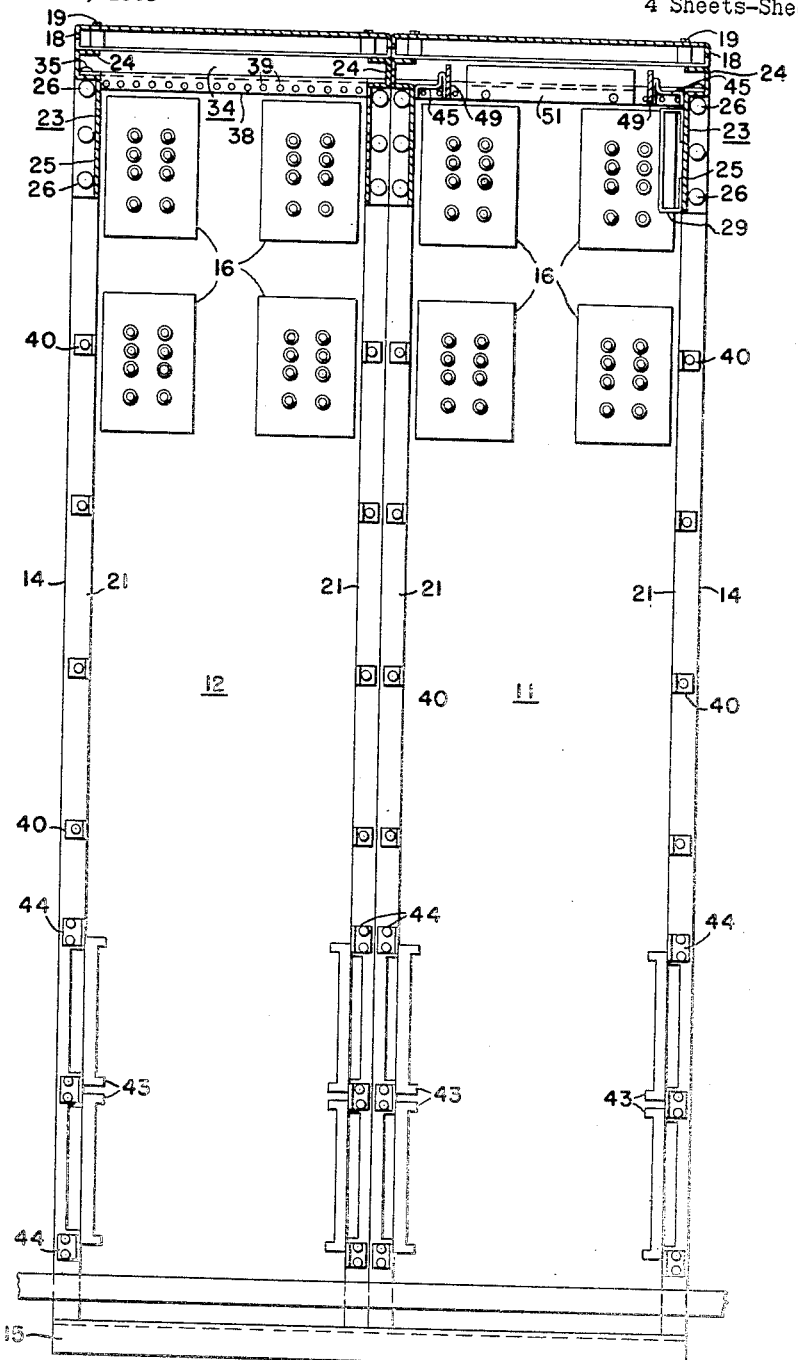
Fig. 2 is a view partly in rear elevation and partly in section of the switchboard structure, the section being taken along the line II—II in Fig. 1.

Referring to the drawings, and particularly to Fig. 2, the structure shown therein comprises two switchboard units 11 and 12, which are of the duplex type. In general, the present switchboard is of the same type as the one disclosed in the copending application of M. J. Brown, and F. F. Lukazsewicz, Serial No. 154,664, filed April 7, 1950, now Patent No. 2,593,975, issued April 22, 1952.

Figure 1:
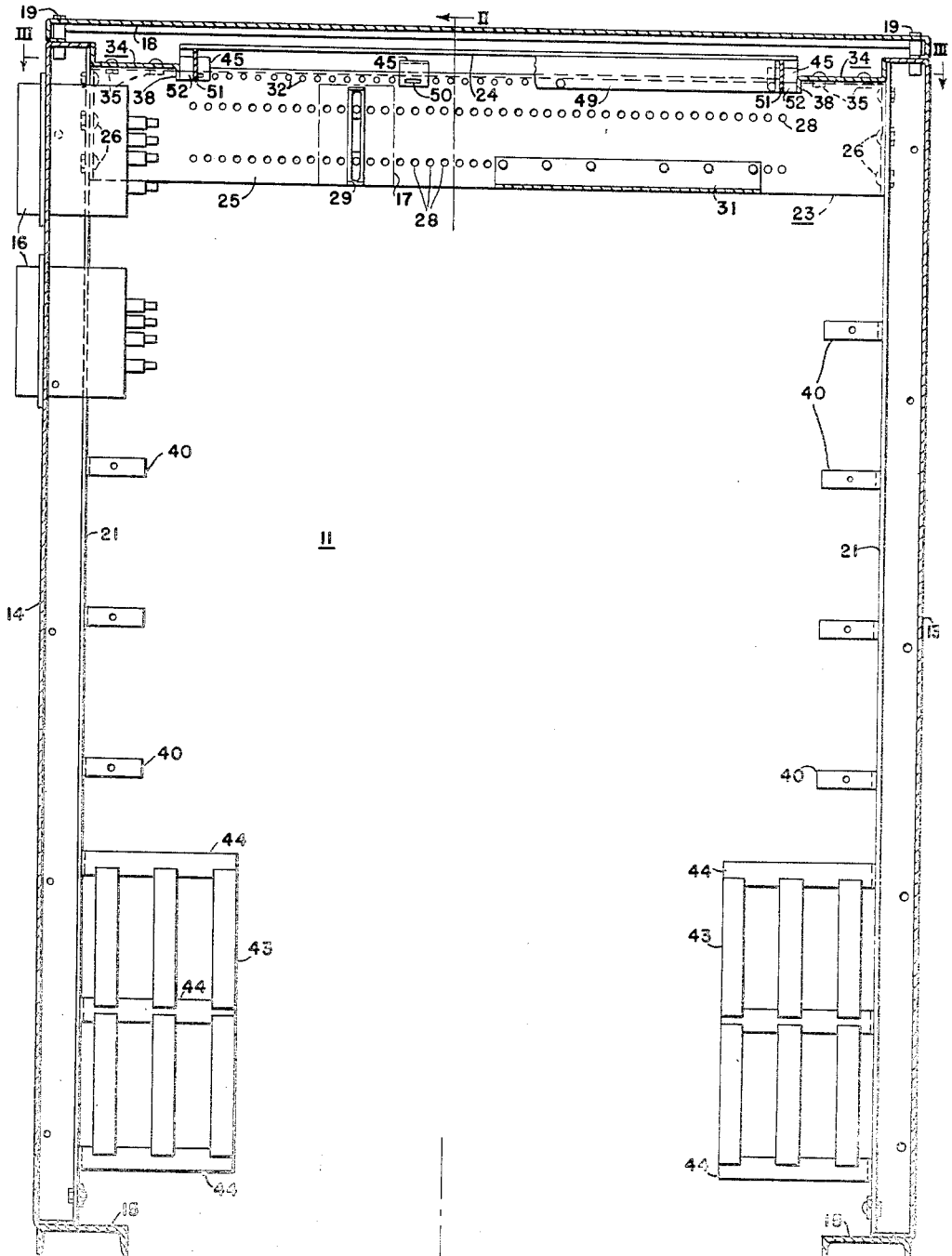
Figure 1 is a view, partly in end elevation and partly in section, of a switchboard structure embodying the principal features of the invention.

As shown more clearly in Fig. 1, each unit comprises two vertical panels 13 and 14, which are disposed back to back in spaced relation. The panels 13 and 14 are preferably composed of sheet steel and they may be supported on channel-shaped bases 15.

Switchboard apparatus of the usual type, such as meters or relays 16, may be mounted on the panels. Also, control switches and other control apparatus (not shown) may be mounted on the panels. It is the usual practice in the construction of duplex switchboards to mount apparatus of certain types on the front panels, where it is most readily accessible, and other apparatus on the rear panels of the duplex units.

As shown, the meters or relays 16 are of the semi-flush mounted type having the cases or housings of the instruments extending a considerable distance to the rear of the switchboard panel. As shown in Fig. 1, the panels 13 and 14 are spaced a sufficient distance apart to permit workmen to enter the space between the panels, thereby having access to the rear terminals of the apparatus mounted on the fronts of the panels, as well as to auxiliary apparatus 17 mounted within the structure at the rear of the panels. A cover member 18 is provided for each unit and is attached to the tops of the panels by screws 19.

As explained in the aforesaid copending application, duplex switchboards of the heavy duty type require a relatively large amount of wiring connections some of which must extend between the apparatus mounted on the front and the rear panels of each unit, and some of which extend between apparatus mounted on different units. Also, part of the apparatus must be connected to other apparatus which is located remotely from the switchboard structure. Furthermore, some switchboards have a relatively large amount of auxiliary apparatus associated with the main instruments and relays mounted on the switchboard panels.

The switchboard structure shown herein, which is known as a light duty duplex switchboard, does not contain as much apparatus as a heavy duty switchboard and, therefore, does not require as many wiring connections. In order to make the required wiring connections in a satisfactory manner, and to provide a structure which has a neat appearance when the wiring is completed, it is desirable to provide wiring troughs or gutters for the wiring connections. Furthermore, it is necessary to provide means for mounting such auxiliary apparatus as is required.

In order to simplify the structure, and at the same time provide satisfactory wiring troughs, I have devised the present structure in which certain of the wiring troughs also function as supporting means for auxiliary apparatus. Furthermore, the wiring is so arranged as to require a minimum number of wiring troughs.

Figure 3:
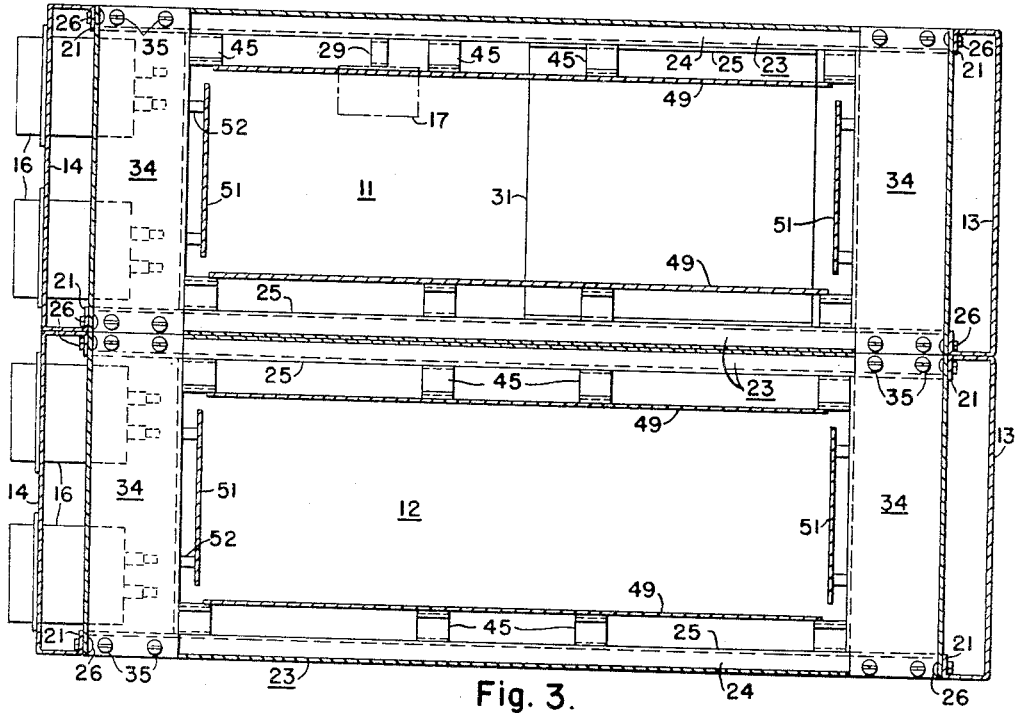
Fig. 3 is a view, in section, taken along the line III—III in Fig. 1.
Figure 4:
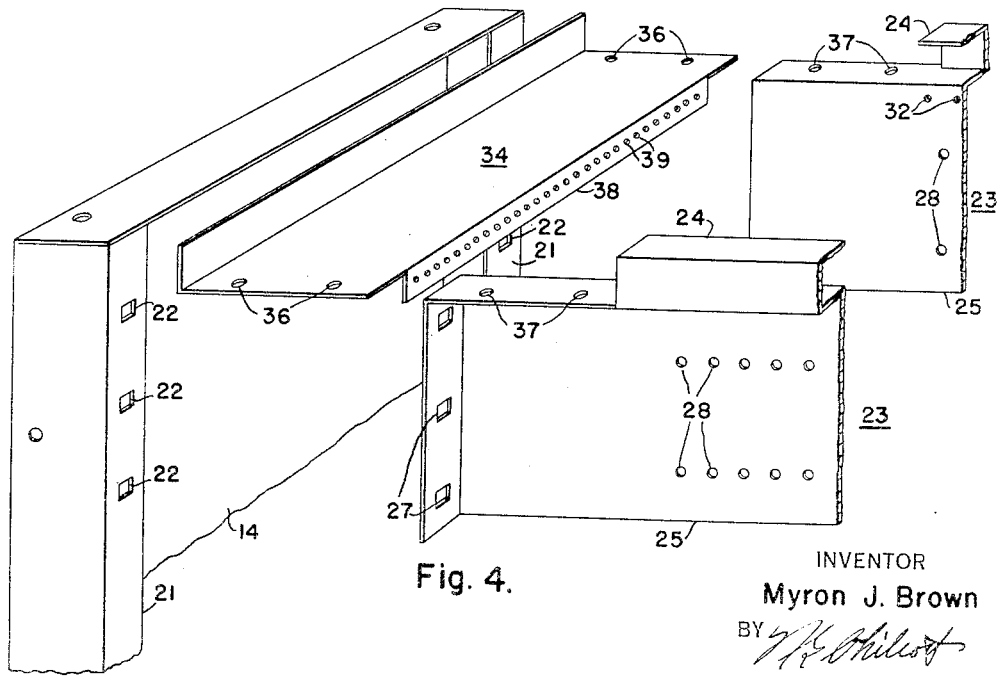
Fig. 4 is an enlarged view, in exploded perspective, of parts of the structure.

As shown most clearly in Figs. 3 and 4, the vertical edges of each panel 13 or 14 have rearwardly extending and inturned flanges 21 provided with openings 22 near the top of the panel. A cross member 23, which comprises a generally C-shaped wiring trough 24 formed integrally with a downwardly extending flange or portion 25 is attached to flanges 21 of the oppositely disposed panels 13 and 14 by means of bolts 26 which extend through openings 27 in the cross member into the openings 22 in the flanges 21.

Thus, two horizontally disposed wiring troughs are provided for each pair of oppositely disposed panels for wires which run between the front and the rear panels of each unit. As shown most clearly in Fig. 1, each cross member 23 is provided with a plurality of holes 28 for attaching universal mounting brackets 29 to the cross member 23. Auxiliary apparatus may be mounted on the cross member by means of the brackets 29. The holes 28 are so spaced and the brackets 29 are so constructed that the brackets may be mounted either vertically or horizontally. As also shown in Figs. 1 and 3, a mounting pan 31 may be attached to the two cross members 23 for each unit, thereby providing additional means for supporting auxiliary apparatus if desired.

Figure 5:
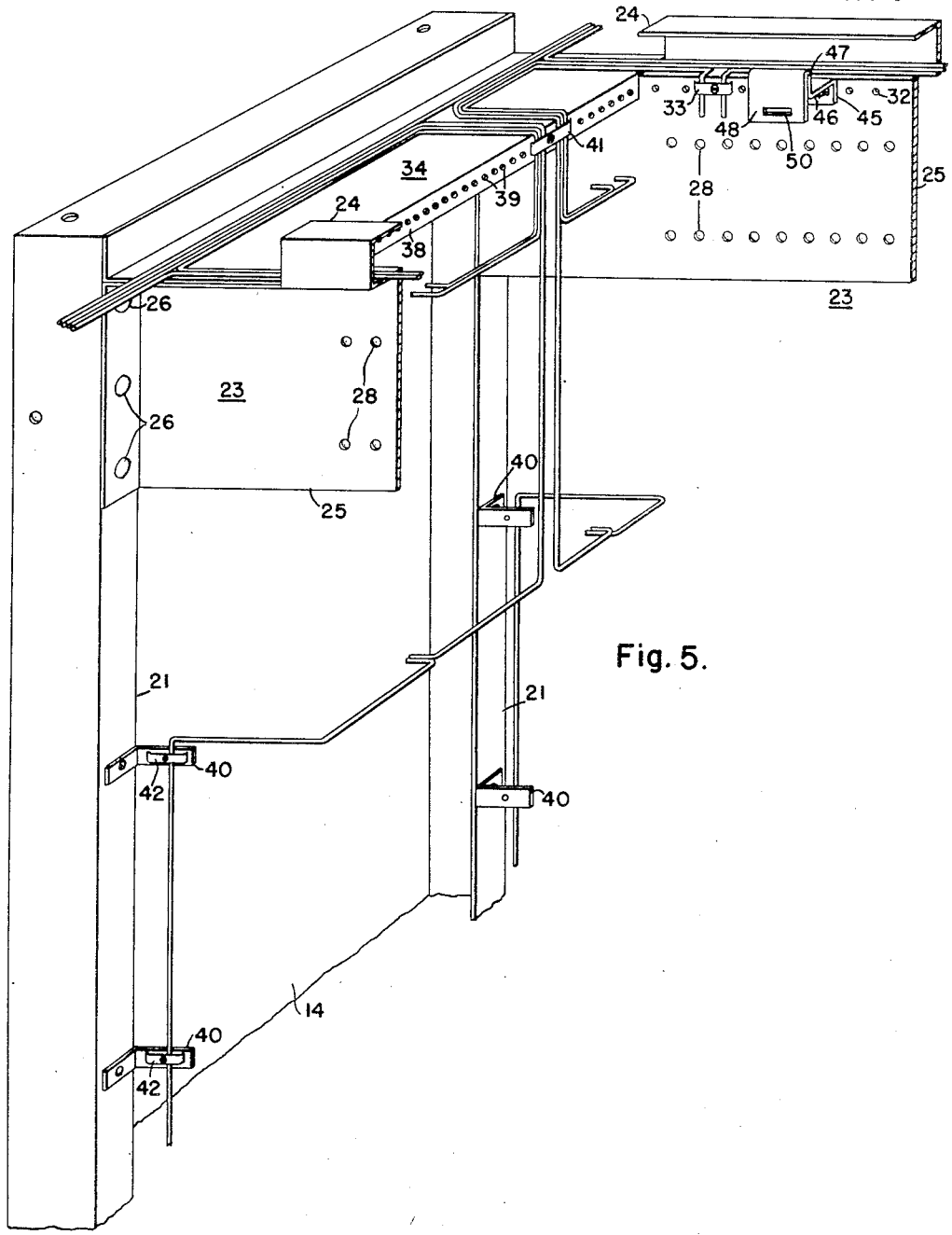
Fig. 5 is an enlarged view, in perspective of a portion of the switchboard structure.

As shown most clearly in Fig. 5, each cross member 23 is provided with a plurality of holes 32, near the top of the downwardly extending portion 25 for attaching wire cleats 33 to the cross member 23. Thus, wires which come out of the wiring gutter 24 and are connected to apparatus mounted on the cross member, may be retained in position by the cleats 33.

As also shown in Figs. 4 and 5, a generally reversed Z-shaped cross panel wiring trough 34 extends across each panel and is supported by the cross members 23. The trough 34 may rest upon the cross members 23 and be connected thereto by bolts 35 which are inserted into openings 36 and 37 provided in the trough 34 and the cross member 23, respectively. The trough 34 has a downwardly extending leg or flange 38 with a plurality of holes 39 therein for attaching wire cleats 41 to the flange 38. Thus, wires which leave the trough 34 for connecting to apparatus mounted on the panel may be retained in position by the cleats 41.

As shown in Fig. 5, wiring cleats 42 may be attached to brackets 40 which are attached to the flanges 21 on the panels 13 or 14 for retaining wires which run from terminal blocks 43 (see Fig. 1) to apparatus mounted on the panels. As shown in Fig. 1, the terminal blocks 43 may be supported by brackets 44 attached to the flanges 21 on the panels.

In this manner, wires may be run from terminal blocks to apparatus mounted on the panels, or from either the cross panel wiring troughs or the inter-panel wiring troughs to apparatus mounted either on the panels or on the inter-panel wiring troughs. Wires may also be run in the cross panel troughs from one panel to another at the same side of the switchboard structure. Also, wires may be run through the inter-panel troughs between panels at the front and the rear of the structure.

Referring to Fig. 5, it will be seen that the bottom of the cross panel wiring trough 34 is in substantially the same horizontal plane as the lower leg of the C-shaped wiring troughs 24, thereby providing a continuous passageway for the wires running between panels through these troughs.

As shown, generally reversed Z-shaped brackets 45 may be attached to the cross members 23 to increase the number of wires which may be placed in the C-shaped wiring trough 24. As shown most clearly in Fig. 5, each bracket 45 has a leg 46 which is disposed at substantially the same level as the lower leg of the C-shaped trough 24. As shown in Figs. 1 and 3, the brackets 45 may be so spaced along the trough 24 that wires may be laid on top of the legs 46 of the brackets 45, thereby increasing the number of wires which may be placed in the trough 24. The wires are retained in the troughs by means of upwardly extending legs 47 on the brackets 45.

As also shown in Fig. 5, each bracket 45 may have a downwardly extending portion 48 to which a cover plate 49 may be attached by screws inserted through an opening 50, provided in the bracket 45. As shown most clearly in Fig. 3, a cover plate 51 may be attached to each cross panel wiring trough 34. The cover plate 51 is spaced from the trough 34 by spacing members 52, and may be attached to the trough by means of screws inserted into the openings 39 in the flange 38 of the trough.

From the foregoing description, it is apparent that I have provided a duplex switchboard structure which is particularly suitable for utilization when the structure is not required to provide mounting facilities and wiring connections for a relatively large amount of switchboard apparatus. The present structure is simplified by providing wiring troughs which also function as supports for apparatus. The troughs are so located and constructed that the wires may be readily installed in the troughs by men working in the space between the switchboard panels. Furthermore, the troughs are located at the tops of the switchboard panels where they do not interfere with workmen working in the space between the vertical panels.

Since numerous changes may be made in the above-described construction, and different embodiments of the invention may be made without departing from the spirit and scope thereof, it is intended that all matter contained in the foregoing description, or shown in the accompanying drawing shall be interpreted as illustrative, and not in a limiting sense.

I claim as my invention:

1. In a switchboard unit, in combination, two vertical panels disposed back to back in spaced relation and having apparatus units mounted thereon, each panel having a rearwardly extending flange with an inturned portion at each one of its vertical edges, generally C-shaped horizontally disposed wiring troughs extending between the tops of oppositely disposed panels and attached to the inturned portions of said flanges, each trough having a portion extending downwardly from and at right angles to one leg of the C-shaped portion with a plurality of shaped holes in the downwardly extending portion for attaching wire retaining cleats, wire retaining means attached to the flanges on the panels for retaining wires running to the apparatus units on the panels and auxiliary apparatus supported by the downwardly extending portions of the wiring troughs, said cleats retaining wires running from said trough to said auxiliary apparatus.

2. In a switchboard unit, in combination, two vertical panels disposed back to back in spaced relation and having apparatus units mounted thereon, each panel having a rearwardly extending flange with an inturned portion at each one of its vertical edges, generally C-shaped horizontally disposed wiring troughs extending between the tops of oppositely disposed panels and attached to the inturned portions of said flanges, each trough having a portion extending downwardly from and at right angles to one leg of the C-shaped portion with a plurality of spaced holes in the downwardly extending portion for attaching wire retaining cleats, wire retaining means attached to the flanges on the panels for retaining wires running to the apparatus units on the panels, and apparatus supporting brackets removably attached to the downwardly extending portions of the wiring troughs for supporting auxiliary apparatus, said cleats retaining wires running from said trough to said auxiliary apparatus.

3. In a switchboard unit, in combination, two vertical panels disposed back to back in spaced relation, generally C-shaped horizontally disposed wiring troughs extending between the tops of oppositely disposed panels, each trough having a portion extending downwardly from and at right angles to one leg of the C-shaped portion with a plurality of spaced holes in the downwardly extending portion for attaching wire retaining cleats, spaced generally reversed Z-shaped wire supporting brackets attached to the downwardly extending portion, each bracket having a horizontal leg disposed substantially in alignment with said one leg of the C-shaped portion, and two vertical legs on each bracket, one vertical leg being attached to the downwardly extending portion of the C-shaped trough and the other vertical leg being disposed parallel to and spaced from the downwardly extending portion of the C-shaped trough.

4. In a switchboard unit, in combination, two vertical panels disposed back to back in spaced relation, generally C-shaped horizontally disposed wiring troughs extending between the tops of oppositely disposed panels, each trough having a portion extending downwardly from and at right angles to one leg of the C-shaped portion with a plurality of spaced holes in the downwardly extending portion for attaching wire retaining cleats, spaced generally reversed Z-shaped wire supporting brackets attached to the downwardly extending portion, generally C-shaped apparatus supporting brackets also attached to the downwardly extending portion, and a vertical leg on each Z-shaped bracket, said vertical leg being disposed parallel to and spaced from the downwardly extending portion on the C-shaped trough.

5. In a switchboard unit, in combination, two vertical panels disposed back to back in spaced relation, each panel having a rearwardly extending flange with an inturned portion at each one of its vertical edges, generally C-shaped horizontally disposed wiring troughs extending between the tops of oppositely disposed panels and attached to the turned portions of said flanges, the legs of the C-shaped troughs being disposed in horizontal planes, each trough having a downwardly extending portion on one leg of the C-shaped portion with a plurality of spaced holes in the downwardly extending portion for attaching wire retaining cleats, spaced generally reversed Z-shaped wire supporting brackets attached to the downwardly extending portion, each one of said Z-shaped brackets having a horizontal leg disposed substantially in alignment with a horizontal leg of the C-shaped portion of the wiring trough, and a vertical leg on each Z-shaped bracket, said vertical leg being disposed parallel to and spaced from the downwardly extending portion on the C-shaped trough.

6. In a switchboard unit, in combination, two vertical panels disposed back to back in spaced relation, each panel having a rearwardly extending flange with an inturned portion at each one of its vertical edges, generally C-shaped horizontally disposed wiring troughs extending between the tops of oppositely disposed panels and attached to the inturned portions of said flanges, the legs of the C-shaped troughs being disposed in horizontal planes, each trough having a downwardly extending portion on one leg of the C-shaped portion with a plurality of spaced holes in the downwardly extending portion for attaching wire retaining cleats, spaced generally reversed Z-shaped wire supporting brackets attached to the downwardly extending portion, each one of said Z-shaped brackets having a horizontal leg disposed substantially in alignment with a horizontal leg of the C-shaped portion of the wiring trough, and a cover plate attached to another leg of the Z-shaped bracket, said other leg being disposed parallel to and spaced from the downwardly extending portion on the C-shaped trough.

7. In a switchboard unit, in combination, two vertical panels disposed back to back in spaced relation, each panel having a rearwardly extending flange at each one of its vertical edges, generally C-shaped horizontally disposed inter-panel wiring troughs extending between oppositely disposed panels and attached to said flanges, a horizontally disposed cross-panel trough extending across each panel from flange to flange and supported by the inter-panel troughs, said interpanel-troughs and said cross-panel trough having overlapping end portions and top surfaces in substantially the same horizontal plane providing a continuous passageway for wires running in said troughs, said cross-panel trough having a downwardly extending flange on one edge with a plurality of holes therein for attaching wire retaining cleats thereto.

8. In a switchboard unit, in combination, two vertical panels disposed back to back in spaced relation, each panel having a rearwardly extending flange at each one of its vertical edges, generally C-shaped horizontally disposed inter-panel wiring troughs extending between oppositely disposed panels and attached to said flanges, the legs of said C-shaped troughs being disposed in horizontal planes, and a horizontally disposed cross-panel trough extending across each panel from flange to flange and supported by end portions of the inter-panel troughs, the bottom of the cross-panel trough and the lower legs of the inter-panel troughs being in substantially the same horizontal plane and having horizontal surfaces providing a continuous passageway for wires running between said panels, said cross-panel trough having a downwardly extending flange on one edge with a plurality of spaced holes therein for attaching wire retaining cleats thereto.

9. In a switchboard unit, in combination, two vertical panels disposed back to back in spaced relation, each panel having a rearwardly extending flange at each one of its vertical edges, generally C-shaped horizontally disposed inter-panel wiring troughs extending between oppositely disposed panels and attached to said flanges, the legs of said C-shaped troughs being disposed in horizontal planes, the lower leg of each trough having a downwardly extending portion with a plurality of spaced holes therein for attaching wire retaining cleats thereto, and a horizontally disposed cross-panel trough extending across each panel from flange to flange and supported by end portions of the inter-panel troughs, the bottom of the cross-panel trough and the lower legs of the inter-panel troughs being in substantially the same horizontal plane and having horizontal surfaces providing a continuous passageway for wires running between said panels.

10. In a switchboard unit, in combination, two vertical panels disposed back to back in spaced relation, each panel having a rearwardly extending flange at each one of its vertical edges, generally C-shaped horizontally disposed inter-panel wiring troughs extending between oppositely disposed panels and attached to said flanges, the legs of said C-shaped troughs being disposed in horizontal planes, the lower leg of each trough having a downwardly extending portion with a plurality of spaced holes therein for attaching wire retaining cleats thereto, and a horizontally disposed cross-panel trough extending across each panel from flange to flange and supported by end portions of the inter-panel troughs, the bottom of the cross-panel trough and the lower legs of the inter-panel troughs being in substantially the same horizontal plane and having horizontal surfaces providing a continuous passageway for wires running between said panels, said cross-panel trough having a downwardly extending flange on one edge with a plurality of spaced holes therein for attaching additional wire retaining cleats thereto.

11. In a switchboard, in combination, a plurality of units each comprising two vertical panels disposed back to back in spaced relation, each panel having a rearwardly extending flange with an inturned portion at each of its vertical edges, horizontally disposed cross members extending between oppositely disposed panels and attached to said flanges, each cross member having an integrally formed generally C-shaped wiring trough at its top, and a horizontally disposed cross-panel trough adjoining said inturned portions of each panel and extending between and supported by the cross members, said C-shaped troughs and said cross-panel troughs having overlapping end portions and top surfaces in substantially the same horizontal plane providing continuous passageways for wires running in said troughs between panels.

12. In a switchboard, in combination, a plurality of units each comprising two vertical panels disposed back to back in spaced relation, each panel having a rearwardly extending flange with an inturned portion at each of its vertical edges, horizontally disposed cross members extending between oppositely disposed panels and attached to said flanges, each cross member having an integrally formed generally C-shaped wiring trough at its top, and a horizontally disposed cross-panel trough adjoining said inturned portions of each panel and extending between and supported by the cross members, said C-shaped troughs and said cross-panel troughs having overlapping end portions and top surfaces in substantially the same horizontal plane providing continuous passageways for wires running in said troughs between panels, said cross members having holes therein for attaching wire retaining cleats and auxiliary apparatus thereto.

13. In switchboard, in combination, a plurality of units each comprising two vertical panels disposed back to back in spaced relation, each panel having a rearwardly extending flange with an inturned portion at each of its vertical edges, horizontally disposed cross members extending between oppositely disposed panels and attached to said flanges, each cross member having an integrally formed generally C-shaped wiring trough at its top, and a horizontally disposed cross-panel trough adjoining said inturned portions of each panel and extending between and supported by the cross members, said C-shaped troughs and said cross-panel troughs having overlapping end portions and top surfaces in substantially the same horizontal plane providing continuous passageways for wires running in said troughs between panels, said cross members having holes therein for attaching wire retaining cleats and auxiliary apparatus thereto, each cross-panel trough having a downwardly extending flange on one edge with spaced holes therein for attaching wire retaining cleats thereto.

References Cited in the file of this patent
UNITED STATES PATENTS

| | | |
|---|---|---|
| 2,098,321 | Treptow | Nov. 9, 1937 |
| 2,140,376 | Anderson | Dec. 13, 1938 |
| 2,219,887 | Bowly | Oct. 29, 1940 |
| 2,363,327 | Hodgkins | Nov. 21, 1944 |
| 2,467,828 | Hodgkins | Apr. 19, 1949 |
| 2,567,740 | Smith | Sept. 11, 1951 |
| 2,593,975 | Brown | Apr. 22, 1952 |